Dec. 6, 1955  H. W. BURNEY  2,725,674
RECIPROCATING POWER BARK HACK AND ACID STIMULATOR
Filed Feb. 17, 1953  2 Sheets-Sheet 1
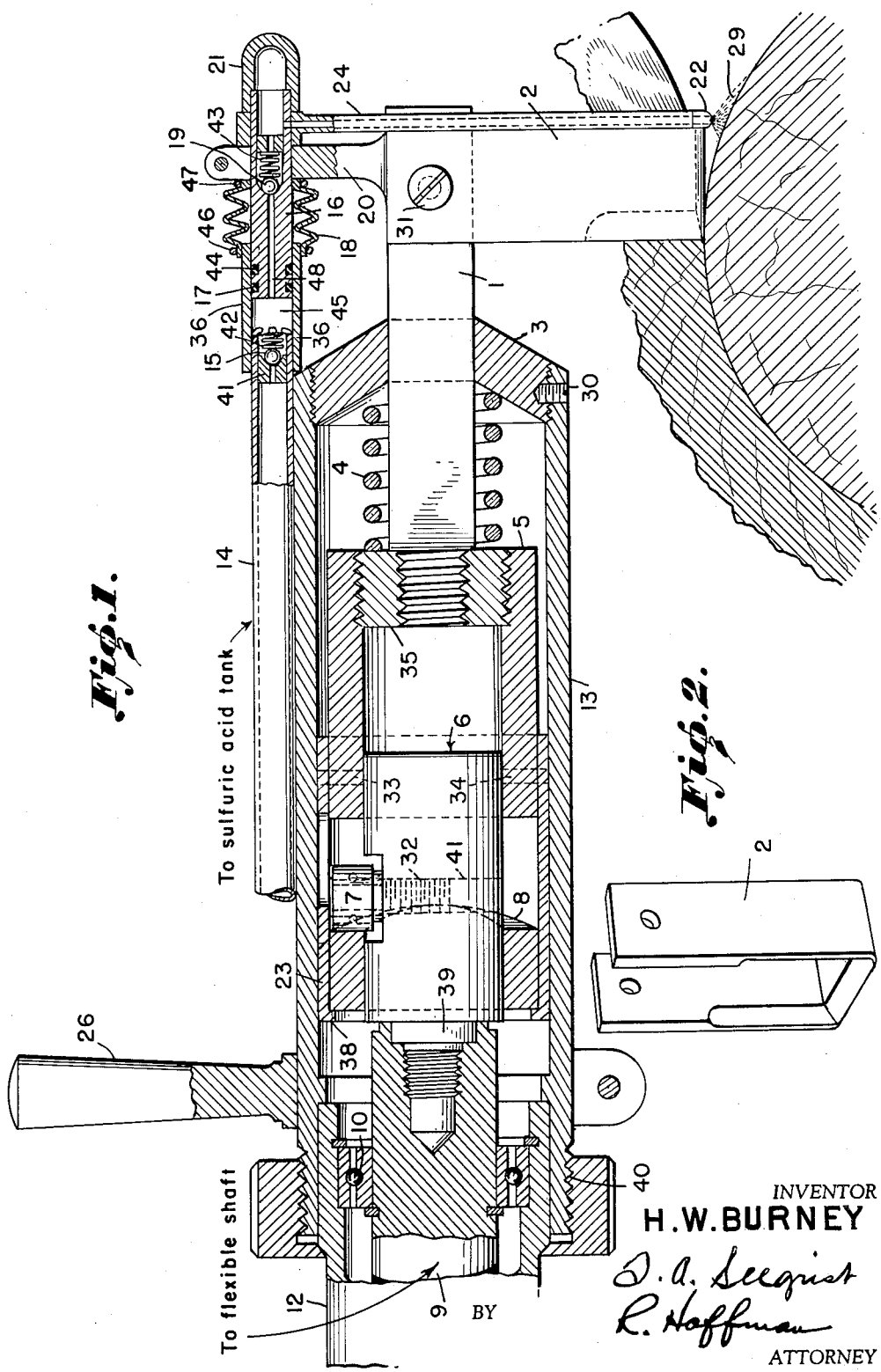
INVENTOR
H. W. BURNEY
D. A. Seegrist
R. Hoffman
ATTORNEY Dec. 6, 1955     H. W. BURNEY     2,725,674
RECIPROCATING POWER BARK HACK AND ACID STIMULATOR
Filed Feb. 17, 1953     2 Sheets-Sheet 2
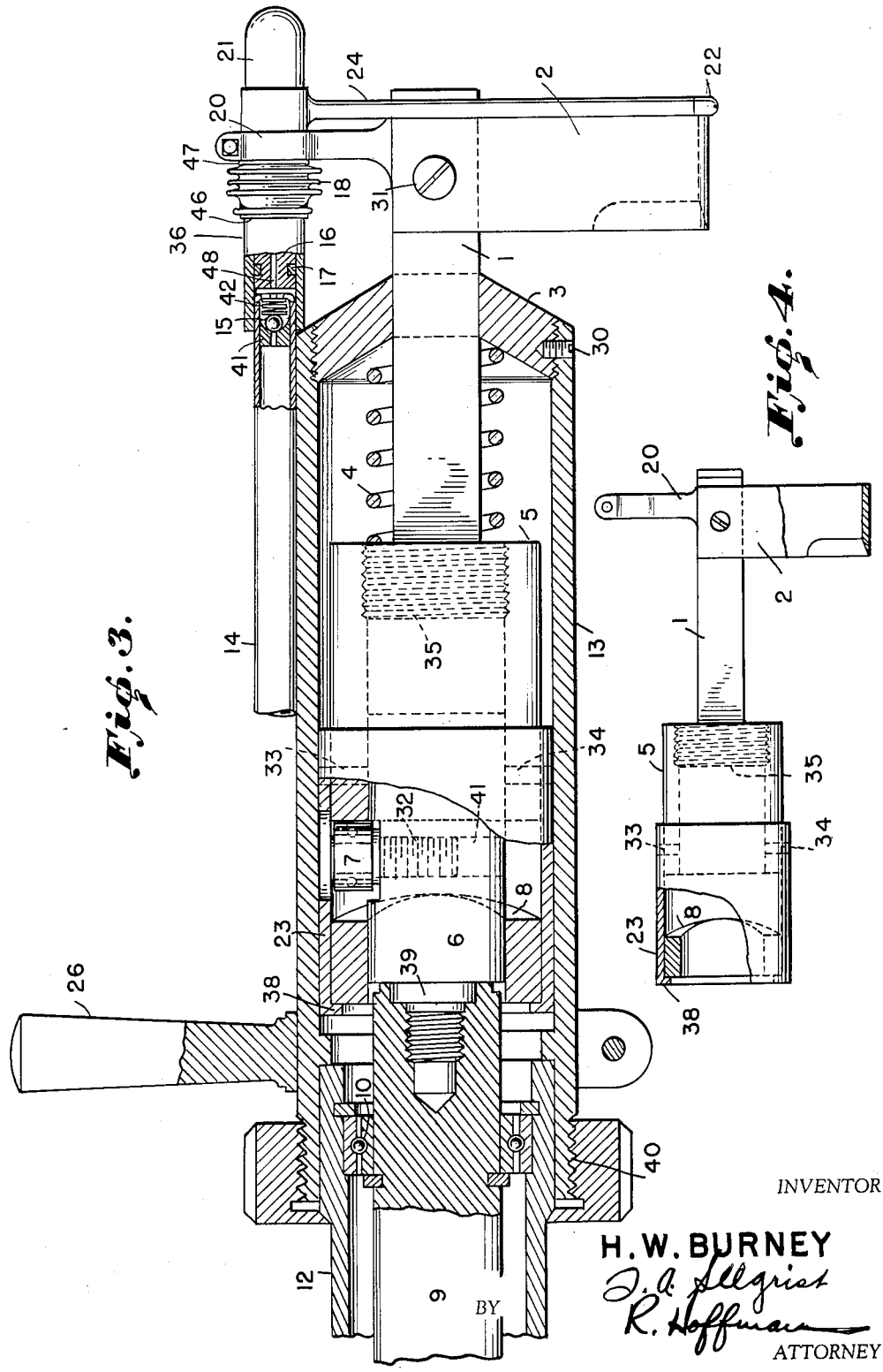
INVENTOR
H. W. BURNEY
ATTORNEY

United States Patent Office 2,725,674
Patented Dec. 6, 1955

2,725,674

RECIPROCATING POWER BARK HACK AND ACID STIMULATOR

Harold W. Burney, Gainesville, Fla., assignor to the United States of America as represented by the Secretary of Agriculture Application February 17, 1953, Serial No. 337,451

4 Claims. (Cl. 47—12)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to a new device for bark chipping pine trees and simultaneously treating the wound with acid to cause the gum to flow. Previous devices for the purpose have had rotating cutters for wounding the trees; but these would break the bark into small pieces, thereby downgrading the gum collected.

One purpose of this invention, therefore, is to produce a wounding device having a reciprocating cutting blade that will remove a continuous strip of bark.

Another object is to produce a tree wounding device which will simultaneously spray acid at the wound as it is made.

Another object of this invention is to produce a reciprocating cutting device that may be operated by a small power supply carried on the back of the operator.

A further object is to produce a cutting device having the cutting edge of the blade facing the operator, permitting pulling the cutter. Since a pulled tool will follow the operator's hand, this eliminates the need for guides and undue fatigue caused by trying to follow guides when the blade is started a little out of line and binds during the cutting.

A further object of the invention is to produce a cutter that will operate only when it is desired to cut a tree, but will automatically stop when the operation is completed.

A still further object is to produce a reciprocating cutter having built thereon a pumping device and nozzle for spraying sulfuric acid into the wound as the bark is removed, which pumping device automatically ceases to operate when the cutter stops.

In order that the invention may be fully understood there follows a detailed description of the device:

Figure 1 is a section through a side elevation showing the device in its operating position in the process of cutting a strip of bark from a tree and simultaneously spraying acid at the bared wood.

Figure 2 shows a U-shaped blade, which is one type of cutting blade that may be used.

Figure 3 is a section through a side elevation showing the device in the inoperative position.

Figure 4 is an elevation of the reciprocating assembly.

In the drawings, 13 represents the cylindrical shell which serves as a housing for the device. A handle 26 is provided at one end of the housing to permit manipulation of the unit. Extending from one end of the housing is a plunger 1 on the external end of which is mounted a cutting blade 2 by means of screw 31. The plunger is supported by conical cap 3 which is screwed into the end of the shell, and which serves as a bearing for the plunger. This cap and bearing may be kept from vibrating loose by means of set screw 30. Situated within the housing is a bearing and guide 23 in which is mounted a cam 8. This cam may be of such dimensions that it may be driven in and held tight against the shoulder 38 of the bearing and guide 23. Also fitted inside the bearing and guide is one end of a sleeve 5 which may be fixed to the guide by means of pins 33—34. The other end of the sleeve is internally threaded to receive the adaptor 35. This adaptor is also threaded internally to receive the end of the plunger 1. As can be seen, the plunger 1, sleeve 5, guide 23, and cam 8 form a rigid assembly capable of sliding back and forth within the housing 13.

The end of the housing opposite the plunger is externally threaded, 40, to take a conventional coupling of a flexible shaft 9. The end of the shaft is mounted on ball bearing 10 within the coupling frame 12. Situated within the cam 8 and sleeve 5, and coaxial with them, is a short shaft 6 having a threaded reduced end 39. The end 39 is threaded into the end of the flexible shaft coupling 9. Thus, rotation of the flexible shaft causes rotation of the small shaft 6. The shaft 6 is provided with a radial hole 41 into which is secured a small pin-like member 32 which serves to carry a ball bearing 7. The hole 41, for instance, may be tapped, and one end of an Allen head screw driven in. The other end of the screw may be machined down to carry the bearing. This ball bearing, in conjunction with the shaft 6 on which it is mounted, serves as a cam follower. A spring 4, placed around the plunger 1, and compressed between the bearing 3 and adaptor 35, causes the cam to be pushed away from the follower when the device is not in use. This is the inoperative position shown in Figure 3.

The operator of the unit carries its source of power with him. This source, not shown, for example, may be a conventional one horsepower 18 pound back pack gasoline motor with a flexible shaft connecting the motor with the unit in the operator's hand. At the start of the operation, the motor is cranked and permitted to idle until the user approaches a tree. At this time a button is pressed that throws the governor on the motor into action. The rest of the operation is fully automatic. The cutting blade is pressed against the tree causing the plunger to pull the cam assembly against the rotating cam follower 7. This imparts a reciprocating motion to the cam assembly which is transmitted to the cutting blade. The motion will continue as long as the user keeps the spring compressed by pulling the blade through the bark. As soon as the blade comes out of the bark, the pressure on spring 4 is released causing it to push the cam away from the follower and automatically stop the reciprocating action.

Since the unit is intended primarily for use in conjunction with an acid stimulation of gum flow, a pump is provided which is mounted on the unit and will spray sulfuric acid directly into the wound behind the blade. This pump is mounted directly on an extension 20 of the plunger 1, and is constructed as follows:

A polyethylene tube 14 serves to conduct the acid from a storage tank, not shown. This tube is rigidly secured in one end of pump cylinder 36, which, itself, is rigidly secured to cylindrical shell 13 by any suitable means (not shown). Piston 16 is a polystyrene piston attached to the extension 20 and operates within cylinder 36, also made of an acid resisting resin. In the end of the polyethylene tube 14, there is inserted a valve 41 which consists of a plastic ball 15 loaded by a glass spring 42. The parts 17 and 44 are a pair of neoprene rings which serve as piston rings. At the opposite end of the piston 16 is another valve consisting of a plastic ball 19 loaded by means of glass spring 43. Part 18 is a neoprene bellows secured to the cylinder 36 and piston 16 by means of rings 46 and 47 and serves to protect the operator from any acid leaking past the piston rings 17 and 44. Part 24 is also made of an acid resistant material such as stainless steel or a mild steel tube having a plastic insert. This delivery tube ends in a nozzle 22 for providing a fine spray 29. 21 is a small air dome that serves to even out the pressure of the acid in delivery tube 24, thus producing a uniform spray.

As is readily evident, the two balls 15 and 19 act as check valves. During operation of the unit, the outward stroke of the piston 16 and plunger 1 creates a vacuum in chamber 45 of the pump, causing the valve 41 to be opened. This draws acid into the chamber 45. On the inward stroke, the pressure exerted by piston 16 causes ball 15 to close valve 41. The acid is forced through the passageway 48 in the piston, and the resulting pressure causes the acid to flow around ball 19, and through delivery tube 24 to nozzle 22. By means of this construction the only places where acid is under positive pressure is between the air dome 21 and nozzle 22. All other acid lines are under vacuum. Should leaks occur, air would merely be sucked into the line but no acid would be sprayed around.

While the pump has been described as being built of certain specific materials, it is obvious that these are not critical. Any acid-resisting material having the necessary mechanical strength may be used.

The operation of the unit has been described in conjunction with the spraying of sulfuric acid to increase the gum flow. However, it may also be used by tree surgeons in pruning trees and spraying the wound with a treating fluid; or it may also be used to poison trees where desired. All that would be necessary would be to change the nozzle 22 to spray fluids of different densities.

Furthermore, since the spray unit is detachable, the tool may be used for tree girdling and other general cutting purposes.

I claim:

1. A reciprocating power bark hack and acid stimulator comprising a stationary pump cylinder; a reciprocating plunger having a blade and pump piston mounted at one end thereof, one end of the piston being slidably mounted within said pump cylinder; a rotatable shaft having a cam follower mounted radially at one end of said shaft; a cam mounted through an adapting member to the other end of the aforementioned plunger; means for normally keeping said cam and cam follower out of contact; said means permitting contact between said cam and cam follower when pressure is applied axially along the aforementioned plunger; said cam being so designed as to transform the rotary motion of the shaft to a reciprocating motion in the plunger and blade.

2. A reciprocating power bark hack and acid stimulator comprising an outer cylindrical shell; a stationary pump cylinder mounted on said shell; a reciprocating plunger supported by a bearing at one end of said shell, said plunger extending in part outside said shell; a blade and pump piston mounted on the external end of the plunger, one end of said piston being slidably mounted within said pump cylinder; a nozzle for spraying acid attached to the other end of said pump cylinder; a coaxial cylindrical bearing and guide inside the outer shell and adapted to slide therein, said bearing and guide having fixed therein at one end a coaxial cylindrical sleeve and adaptor, said cylindrical sleeve and adaptor being fixed also to the internal end of the aforementioned plunger, and a coaxial cam fixed within the other end of said bearing and guide; a rotatable cam follower mounted radially on a rotatable shaft extending coaxially through said cam and sleeve, said cam follower being fixed to said shaft at a point between the cam and sleeve; a spring designed to keep the cam and follower out of contact when the device is not in use, said cam and cam follower being forced into contact on compression of said spring, said cam being designed to convert the rotary motion of the shaft and cam follower to a reciprocating motion in the plunger and blade.

3. A reciprocating power bark hack and acid stimulator comprising: an outer cylindrical shell; a reciprocating plunger supported by a bearing at one end of said shell, said plunger extending in part inside and in part outside said shell; a blade mounted on the external end of said plunger; pump means comprising a coacting stationary element and a slidable element, said stationary element being mounted on the cylindrical shell and the slidable element mounted on the external portion of the reciprocating plunger, said coacting stationary and slidable elements being adapted to pump liquid during periods of reciprocating motion of the plunger; and means mounted within the cylindrical shell adapted to impart reciprocating motion to the blade-carrying plunger.

4. A reciprocating power bark hack and acid stimulator comprising: an outer cylindrical shell; a reciprocating plunger supported by a bearing at one end of said shell, said plunger extending in part inside and in part outside said shell; a blade mounted on the external end of said plunger; pump means comprising a coacting stationary element and a slidable element, said stationary element being mounted on the cylindrical shell and the slidable element mounted on the external portion of the reciprocating plunger, said coacting stationary and slidable elements being adapted to pump liquid during periods of reciprocating motion of the plunger; a nozzle for spraying liquid attached to the slidable pump element; a coaxial cylindrical bearing and guide inside the outer shell and adapted to slide therein, said bearing and guide having fixed therein at one end a coaxial cylindrical sleeve and adaptor, said cylindrical sleeve and adaptor being fixed also to the internal end of the aforementioned plunger, and a coaxial cam fixed within the other end of said bearing and guide; a rotatable cam follower mounted radially on a rotatable shaft extending coaxially through said cam and sleeve, said cam follower being fixed to said shaft at a point between the cam and sleeve; a spring adapted to keep the cam and follower out of contact when the device is not in use, said cam and cam follower being forced into contact on compression of said spring, said cam being designed to convert the rotary motion of the shaft and cam follower to a reciprocating motion in the plunger and blade.

References Cited in the file of this patent

Ryberg et al.: "Research in Equipment for the Production of Gum Naval Stores." Engineering Progress at Univ. Fla., vol. 3, No. 6, Aug. 1949, pp. 1–20, Tech. Paper Series No. 32, Fla. Eng. & Ind. Expt. Sta., Univ. Fla., Gainesville, Fla. Same article, published June 1949 in J. Fla. Engineering Soc., vol. 3, pp. 50–69.